United States Patent [19]

DeCook et al.

[11] Patent Number: 5,600,394

[45] Date of Patent: Feb. 4, 1997

[54] SMART FILM CARTRIDGE MAGAZINE

[75] Inventors: Bradley C. DeCook, Rochester; Brian K. Gallipeau, Fairport; David P. D'Aurelio, Hilton, all of N.Y.

[73] Assignee: Eastman Kodak Company, Rochester, N.Y.

[21] Appl. No.: 412,246

[22] Filed: Mar. 28, 1995

Related U.S. Application Data

[62] Division of Ser. No. 241,884, May 12, 1984, Pat. No. 5,475,461.

[51] Int. Cl.$^6$ .............................. G03B 17/26; G03D 13/08
[52] U.S. Cl. ............................ 396/647; 396/570; 396/512
[58] Field of Search ...................... 354/275, 313, 354/319–321, 323, 340; 369/34, 38, 30; 198/131; 355/27, 40, 75, 76; 358/909

[56] References Cited

U.S. PATENT DOCUMENTS

| | | | |
|---|---|---|---|
| 3,753,486 | 8/1973 | Vogt et al. | 198/131 |
| 4,675,755 | 6/1987 | Baumeister et al. | 369/34 X |
| 4,797,698 | 1/1989 | Uenaka et al. | 354/319 |
| 5,031,852 | 7/1991 | Dowling et al. | 354/275 |
| 5,032,707 | 7/1991 | Gundmundson et al. | 355/40 |
| 5,090,863 | 2/1992 | Lichti, Sr. et al. | 414/331 |
| 5,162,842 | 11/1992 | Shiota | 355/40 |
| 5,191,693 | 3/1993 | Umetsu | 198/803.14 X |
| 5,197,844 | 3/1993 | Lichti, Sr. et al. | 414/313 |
| 5,200,777 | 4/1993 | Zander | 354/275 |
| 5,209,626 | 5/1993 | Lichti, Sr. et al. | 414/331 |
| 5,212,512 | 5/1993 | Shiota | 354/319 |
| 5,217,688 | 6/1993 | Von Lersner | 422/26 |
| 5,224,585 | 7/1993 | Blanco et al. | 198/803.01 |
| 5,231,439 | 7/1993 | Takahashi et al. | 354/321 X |
| 5,238,351 | 8/1993 | Lichti, Sr. et al. | 414/331 |
| 5,333,033 | 7/1994 | Blackman | 355/27 |
| 5,347,338 | 9/1994 | Weibel | 354/340 |
| 5,357,495 | 10/1994 | Solhjell | 369/34 |

FOREIGN PATENT DOCUMENTS 0591740 4/1994 European Pat. Off. .

OTHER PUBLICATIONS

JP 4204846, Published Jul. 27, 1992, Patent Abstracts of Japan, Treatment Method for Photographic Film, Shioda Kazuo.

*Primary Examiner*—D. Rutledge
*Attorney, Agent, or Firm*—Frank Pincelli

[57] ABSTRACT

A magazine having a plurality of cavities, each cavity designed for holding and dispensing a film cartridge. A memory is secured to the magazine for retaining and storing information relating to the magazine, cartridge, and/or photosensitive material.

4 Claims, 3 Drawing Sheets

SMART FILM CARTRIDGE MAGAZINE

CROSS-REFERENCE TO RELATED APPLICATIONS

This is a Division of application U.S. Ser. No. 241,884, filed 12 May 1994 now U.S. Pat. No. 5,475,461.

Reference is made to commonly assigned copending U.S. patent application Ser. No. 08/242,472 now U.S. Pat. No. 5,452,037 entitled FILM CARTRIDGE MAGAZINE filed on even date herewith in the name of Robert J. Blackman; U.S. patent application Ser. No. 08/241,986 entitled RANDOM BATCH PHOTOFINISHING filed on even date herewith in the names of Jack C. Demerit, Jr., Walter C. Slater and Joseph P. Kent; and U.S. patent application Ser. No. 08/242,563 now U.S. Pat. No. 5,473,352 entitled FILM CARTRIDGE MAGAZINE in the name of Alan G. Reddig, Thomas C. Merle, Gerald F. Sherman, Jr. and Alfonso Ianni, the above applications are hereby incorporated by reference in to the present application.

FIELD OF THE INVENTION

The present invention relates to magazines for use in photography which are used to contain and facilitate the handling of a plurality Of film cartridges containing strips of photosensitive material.

In current photofinishing operations, film rolls are accumulated, sorted, and removed from the containment cartridges for processing. The cartridges are cracked open to release the film, and discarded in a very early stage of the operation. During their short life the cartridges are handled in bins, totes and conveyors for isolating batches of film according to required processing parameters. Although the film cartridge often does not last long in the processing facility, the cartridge magazine has been employed to facilitate their handling. Gudmundson et al, U.S. Pat. No. 5,032,707, issued Jul. 16, 1991, discloses one example that includes a film magazine for maintaining assorted films in transportable batches. The magazine comprises a rectangular tube open at one end with a slot along the inside.

Photographic photofinishing processes have been proposed in which the film is retained in its cartridge throughout the processing operation, or returned to a similar cartridge after film processing. The cartridges are typically handled by conveyors, or again, in rectangular tubes. One approach is presented in Takahashi et al, U.S. Pat. No. 5,231,439, issued Jul. 27, 1993. Takahashi et al uses rectangular tubes, including an escape mechanism for detaining and dispensing the film cartridges.

In a typical photofinishing operation, multiple rolls of films are spliced together and thread through high speed processors and printers. Each roll of processed film is called an "order" and the spliced rolls are called a "batch". In a typical prior art printer, the printer scans each film negative and calculates a set of data, which then can be used to control the exposure done in the printing operation. Occasionally, some of the film negatives will not print properly. When this happens, the orders which contain the imperfect print have to separated from the rest of the batch and the defective prints reprinted. This process, often referred to as "makeover", involves the de-splicing of the film and re-printing the defective prints at a later time.

Co-pending U.S. patent application Ser. No. 08/241,986 entitled RANDOM MATCH PHOTOFINISHING, filed on even date herewith and previously referred to, discloses that the filmstrip resides in its own cartridge throughout the photofinishing process and are not spliced together with all the orders. In this type of a system the films are scanned at an earlier station whereby information relating to exposure and other related information can be readily stored for later use by various other photofinishing processes such as the printer. This information would typically be sent to a host computer or directly to the device for storage and later use when the order comes to that piece of equipment. These type of systems require computer networking in order for the information to be properly transmitted and stored.

The present invention is directed to a magazine which solves many of the problems of the prior art. In particular, a magazine is provided for holding cartridges containing photosensitive material which can be used throughout the entire photofinishing process. The magazine is provided with nonvolatile memory for retaining and storing information relating to the magazine and/or the photosensitive material contained within the cartridges. As the magazine is transported from one piece of photofinishing equipment to another, the stored information remains with the cartridge at all times. The photofinishing equipment can read information provided on the magazine which can be used to control operation of the equipment. Also, information may be written on the magazine memory for later use by other equipment in the photofinishing process.

SUMMARY OF THE INVENTION

In one aspect of the present invention there is provided a magazine having a plurality of cavities, each cavity designed for holding and dispensing a film cartridge; and a memory is secured to the magazine for retaining and storing information relating to the magazine, cartridge, and/or photosensitive material disposed within the film cartridge.

These and other features and advantages of the invention will be more clearly understood and appreciated from a review of the following detailed description of a preferred embodiment and appended claims, and by reference to the accompanying drawings.

DETAILED DESCRIPTION OF THE INVENTION

Figure 1:
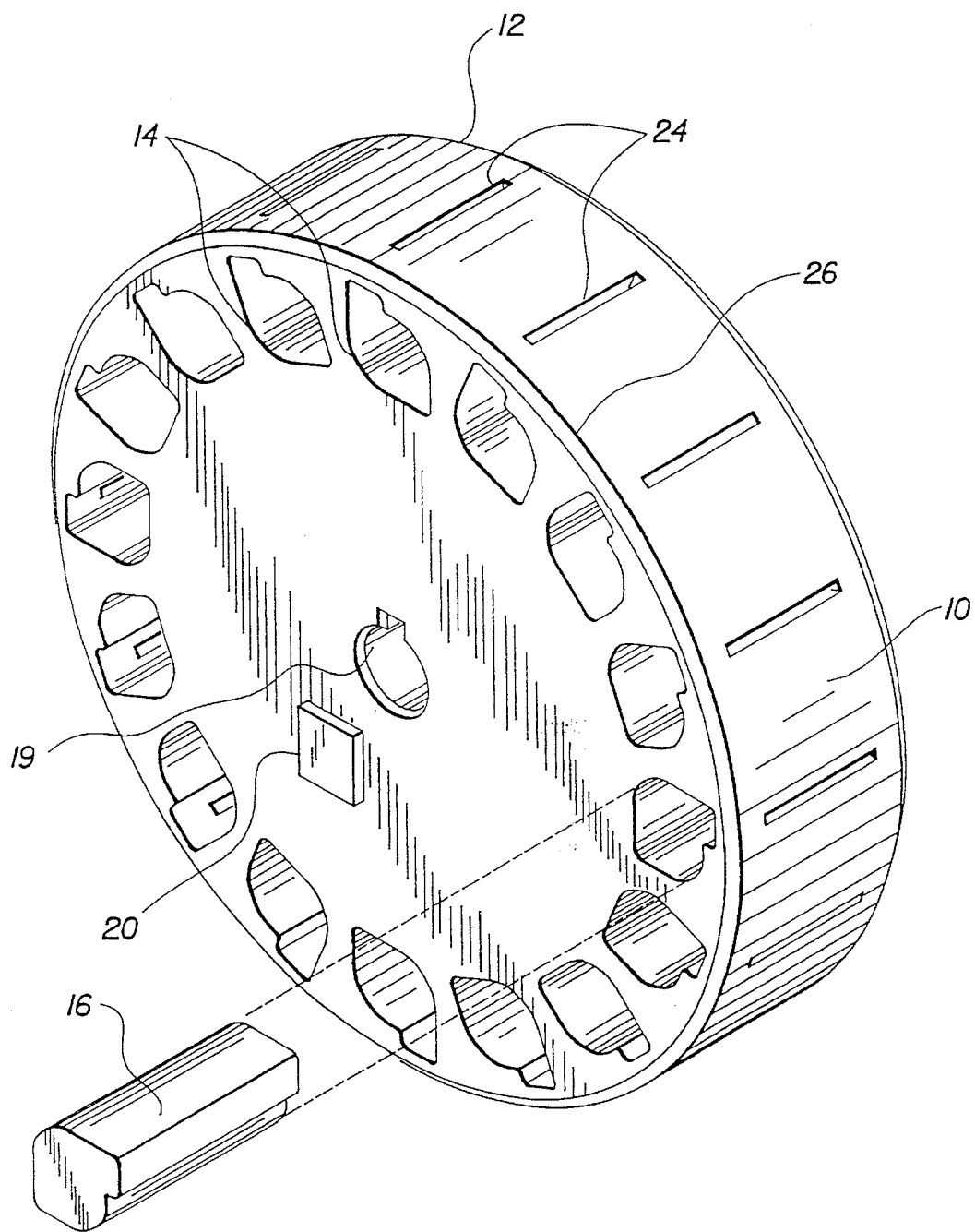
FIG. 1 is a perspective view of the film cartridge magazine made in accordance with the present invention.
Figure 2:
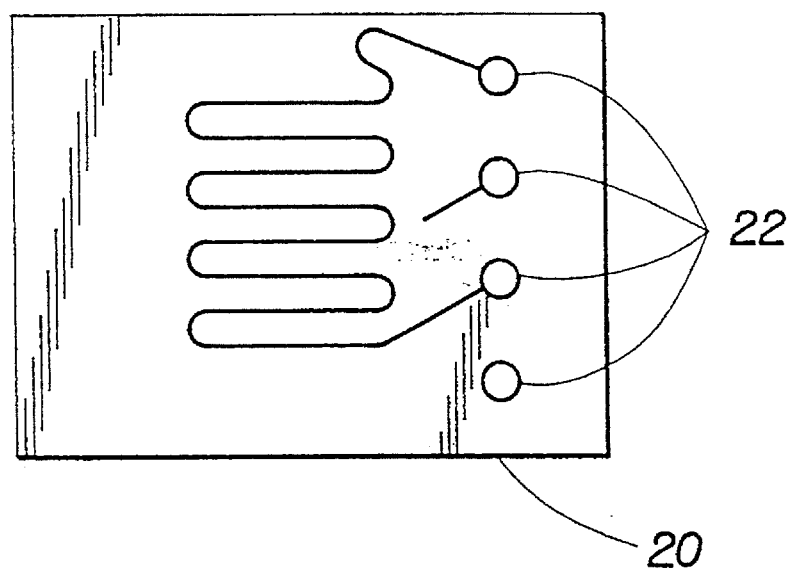
FIG. 2 is an enlarged front elevational view of a nonvolatile memory device which may be secured to the magazine.

Referring to FIGS. 1-2, there is illustrated a magazine 10 made in accordance with the present invention. The magazine 10 includes a support structure 12 having a plurality of cavities/pockets 14 for receiving a plurality of film cartridges 16 (only one shown). Each cavity 14 is configured so as to closely conform to the outer configuration of the film cartridge 16. In the embodiment illustrated, cartridge 16 is a thrust type cartridge such as described in U.S. Pat. Nos. 5,031,852 and 5,200,777, which are hereby incorporated by reference. Also, in the particular embodiment illustrated, support structure 12 has a generally disc shape. However, the magazine and support structure may take any desired configuration. Appropriate means are provided for retaining the film cartridges within each of the cavities 14. In the embodiment illustrated, the cartridge 16 in each cavity 14 is held in position by a spring loaded detent member (not shown) secured to structure 12, which engages the cartridge with sufficient force so as to maintain the cartridge within the support structure 12. However, the retaining force is sufficiently low so that the cartridge can be easily inserted or removed from the cavity. It is to be understood that any other means may be used for retaining of the film cartridges within the support structure. Structure 12 includes a keyed drive opening 19 which can be used for mounting the magazine 10 in the photofinishing equipment and for rotating the magazine 10 to the desired position with respect to the device for allowing insertion or dispensing of the cartridge 16 and/or for allowing thrusting of the film from the cartridge, or back into the cartridge, while still in the magazine. The keyed opening 19 also provides a home position so that each pocket can be easily identified by its location.

The magazine 10 includes a nonvolatile memory device 20 which is secured to the support structure 12. In the particular embodiment illustrated, support 12 comprises a generally cylindrical disc having a plurality of pockets/cavities 14 designed to hold the cartridge. The particular number and pattern of the pockets may be varied as desired. A suitable magazine is shown and described in copending U.S. patent application Ser. No. 08/242,472, previously referred to and incorporated herein by reference. The magazine 10 may be modified to any other configurations desired, such as disclosed in copending U.S. patent application Ser. No. 08/242,563, previously referred to and incorporated herein by reference. It is to be understood that the nonvolatile memory device 20 will be a permanent part of the structure or secured to the magazine and/or support structure in any desired fashion. The nonvolatile memory device 20 comprises means upon which information can be written and/or read by an appropriate scanning/reading device. The nonvolatile memory device comprises a circuit board 22 which contains the necessary computer memory as commonly used in the computer industry. The circuit board includes an appropriate number of contacts 22 so that power control and data lines may be supplied to the device 20. In the particular embodiment illustrated, the device 20 comprises a Serial EE Prom. Alternatively, device 20 may comprise a magnetic storage device, a laser storage device, or any other device capable of storing information thereon which can be read and/or written thereon. The cavities 14, in the embodiment illustrated, are disposed adjacent the periphery of the support structure 20. However, the cavities 14 may be provided in any desired pattern. A plurality of cavity openings 24 are provided at the outer edge 26. One cavity opening 24 is associated with each cavity 14 for allowing thrusting of the film (photosensitive material) out of, or back into, its respective cartridge 16 for use by the photofinishing device in which the magazine is placed. Thus, the cartridge 16 need not be removed from the magazine in order for the film to be removed and processed by the device.

In order to more fully understand the present invention a brief description of its use will now be discussed. First, a magazine 10, made in accordance with the invention, is provided wherein the cavities 14 are filled with the appropriate film cartridges 16. The magazine may then be mounted on a photofinishing device through the use of keyed opening 19. If the film with the cartridge has already been scanned and information obtained, the nonvolatile memory device 20 can be written upon by an appropriate write device (not shown) so as to transfer information regarding the cartridges or film disposed in the cartridges placed in the magazine. If the film has not been scanned, the magazine containing the cartridges can be taken to a scanning station whereby information relating to the customer order or film can be read. At this station information such as the customer name and address, cartridge identification number (CID), film type can be placed in the nonvolatile memory of the device 20. Thereafter the magazine and the cartridges may be taken to a processing device where the film wherein is processed for developing. Thereafter the film may be taken to a second separate workstation wherein certain informational data relating to the image developed on the film can be read. This information once read can be stored on the nonvolatile memory relating this information to a specific location in the magazine and/or the CID (cartridge identification number) of the film cartridge. The information stored in the nonvolatile memory can be used by the device for whatever function may be appropriate at that workstation. For example, the magazine containing the cartridges 16 can be taken to a printer whereby the cartridges are sequentially brought to the printer for exposure and printing onto photographic paper. By appropriately reading the information on the device 20 the printer can be properly adjusted to allow the appropriate exposure of the film. It is of course understood that any other information can be placed on the nonvolatile memory device 10 that may be useful in printing other pictures.

Figure 3:
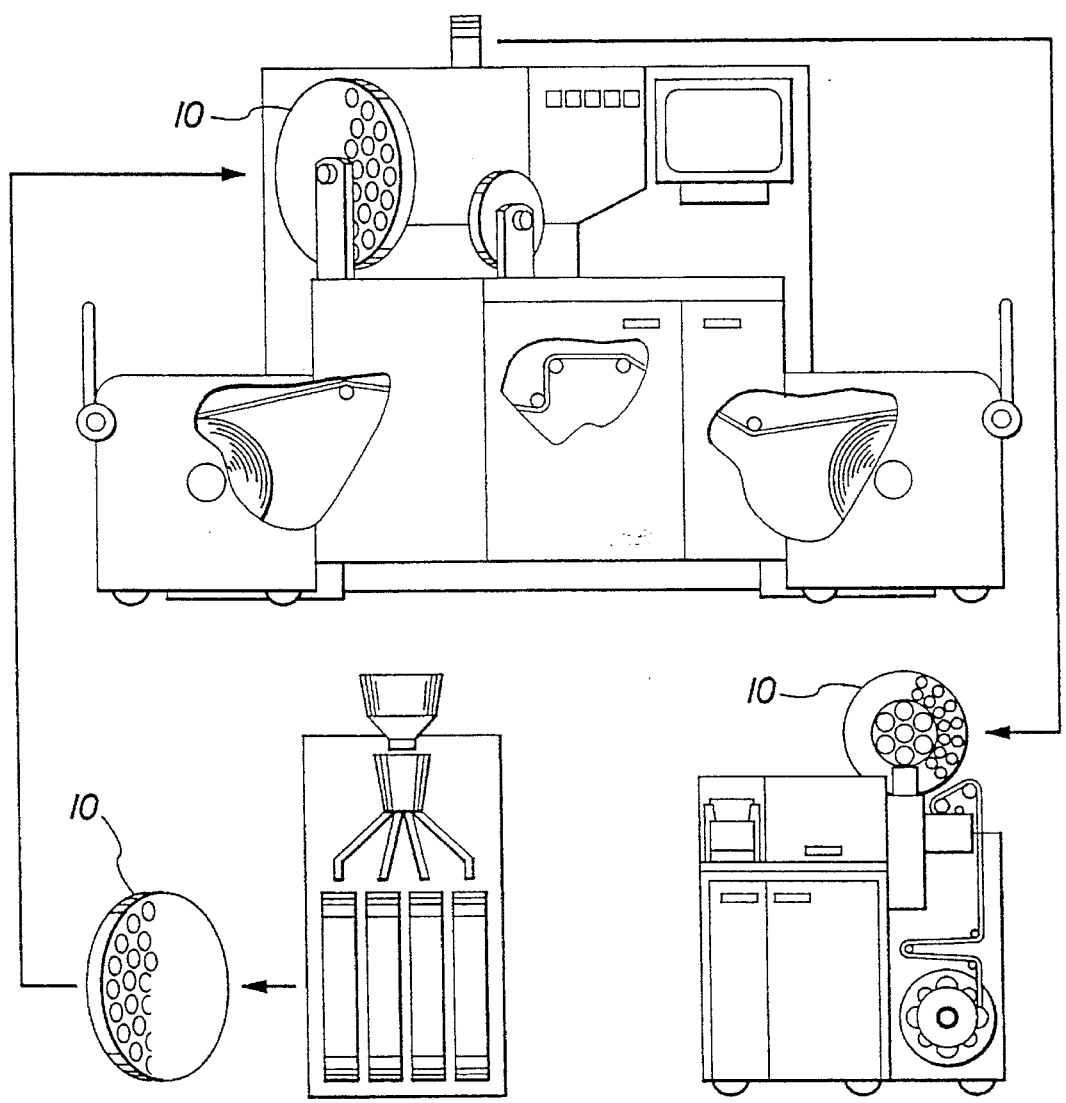
FIG. 3 is a schematic diagram illustrating various stations wherein the magazine is moved for operation.

Thereafter, the cartridges may be returned to the magazine and the magazine taken to the next work station. For example, the magazine 10 can now be taken to a photofinishing device/station where appropriate envelopes may be provided and combined with the prints that have been developed (see FIG. 3). The information that is stored on the magazine could be used for locating and bringing together the prints and the film cartridge 16 stored in the magazine and for preparing and printing an appropriate customer return envelope whereby the pictures, negative, and cartridge can be returned to the customer.

If and when one of the cartridges is required to be reprinted, this cartridge can be transferred over to another magazine or retained in its current magazine whereby the information necessary for reprinting can be encoded on the nonvolatile memory device 20 and again be placed through the printing process or any other process required. Thus, when the magazine is brought again to the printer or other photofinishing device, additional control information that has been placed in device 20 will control which of the cartridges will be required for reprinting and/or reprocessing. Alternatively, all of the cartridges required for makeover and reprinting can be put into a single magazine whereby information can be read out from the old magazines and stored onto the new magazine for controlling of the photofinishing equipment to which it is later sent.

In addition to providing and storing information relating to each of the cartridges, the memory device 20 can be used for locating and finding of any particular order within the magazine. The location of any particular cartridge 16 can be placed on the device 20 so that the photofinishing equipment can quickly and easily find the cartridge of interest to be used. Information relating to magazine size, type, and pattern of the cavities may also be written on memory device 20. Since the magazine home position can be easily determined, for example, by the keyed opening 19, random access to any of the cartridges can be easily accomplished. The stored information allows the accurate locating and finding any of the cartridges in the magazine.

Thus, there is provided a magazine, containing a plurality of cavities for holding cartridges having a memory device which can be useful in providing information during the photofinishing process and for locating any particular order or cartridge in a random manner for any desired purpose.

It is to be understood that various changes and modifications may be made without departing from the scope of the present invention. The present invention being limited by the following claims.

Parts List

10 ... magazine
14 ... cavities/pockets
16 ... film cartridge.
18 ... detent member
19 ... keyed opening
20 ... memory device
22 ... circuit board
24 ... openings
26 ... outer edge

We claim:

1. A magazine for holding a plurality of film cartridges, each having a photosensitive material disposed therein, comprising:

a support structure having a plurality of cavities for holding and retaining the plurality of film cartridges therein, and a memory secured to the magazine for retaining information regarding the film exposed for controlling operation of a photofinishing device with respect to the film contained within the plurality of film cartridges and for identifying the location of each of said film cartridges.

2. A magazine according to claim 1 wherein said memory comprises a Serial EE Prom having a plurality of contacts for allowing information and power to be supplied to the Serial EE Prom.

3. A magazine according to claim 1 wherein each film cartridge comprises a thrust film cartridge.

4. A system for processing of a photosensitive material disposed within a film cartridge, comprising:

a) a magazine having a plurality retaining pockets, each pocket designed for receiving a film cartridge, said magazine having a memory for recording of information relating to the film disposed within each of the film cartridges and for identifying the location of each of said film cartridges; and b) a photofinishing device for conducting at least one photofinishing operation on the film contained within the plurality of cartridges, in accordance with information stored in said memory.

* * * * *